July 2, 1968     H. W. C. AAMOT     3,390,729

PENDULUM STEERED THERMAL PROBE

Filed Jan. 25, 1967     2 Sheets-Sheet 1

Inventor:
Haldor W. C. Aamot,
by Harry M. Saragovitz,
Edward J. Kelly, Herbert Berl
& Lawrence E. Labadini
Attorneys July 2, 1968 H. W. C. AAMOT 3,390,729

PENDULUM STEERED THERMAL PROBE

Filed Jan. 25, 1967 2 Sheets-Sheet 2

Inventor:
Haldor W. C. Aamot,
by Harry M. Saragovitz
Edward J. Kelly, Herbert Berl
& Lawrence E. Labadini
Attorneys United States Patent Office 3,390,729
Patented July 2, 1968

3,390,729
PENDULUM STEERED THERMAL PROBE
Haldor W. C. Aamot, Hanover, N.H., assignor to the United States of America as represented by the Secretary of the Army
Filed Jan. 25, 1967, Ser. No. 612,295
10 Claims. (Cl. 175—16)

ABSTRACT OF THE DISCLOSURE

The stabilization of the attitude and path of a thermal probe is accomplished by placing the support point of the probe above its center of gravity and allowing the probe to hang plumb within the hole or fluid area created by a hot point spaced below said support point.

---

This invention relates to a gravity controlled, thermal probe for penetrating into geological formations and, more particularly, to a thermal probe stabilized so as to penetrate along any gravitational field from the point of entry toward its center.

Physical studies of geological, including glaciological, formations are usually accomplished by conventional drilling or seismic techniques. Conventional drilling, however, is limited as to depth of penetration and, in addition, requires complex and heavy equipment which cannot be transported easily and is costly to operate and maintain. Seismic techniques, on the other hand, while capable of providing information from greater depths than is possible by conventional drilling, are more limited as to the type of information which may be obtained.

With respect to glaciological studies, for example, there has been a long-standing requirement for a simple and reliable means suitable for obtaining physical measurements at various depths within the ice mass. The recent development and utilization of thermal probes has provided a valuable tool for delivering instrumented packages to desired depths in glaciers from which depths the desired measurements can be made and then transmitted to the surface. Probes of this type are discussed by K. Philberth in an article entitled "Une méthode pour mesurer les températeures à l'entérieur d'un Inlandsis" appearing in Comptes Rendus 254, No. 22, May 28, 1962, at p. 3881. Thermal probes penetrate by melting the ice by conductive heat transfer and by sinking downwardly in the meltwater bringing their heated surfaces continually to bear on the ice beneath. Such probes are gravity controlled and do not rely on mechanical linkage with the surface to control their attitude or descent. The heat required to melt the ice is generated electrically and the electrical power is delivered from a surface station to the probe via an insulated electrical conductor. Since such conductors become anchored in the meltwater as it again turns to ice, it is necessary that the cable and signal wire be carried in the probe and payed out as the probe continues its downward descent.

A serious problem exists, however, with respect to the use of such thermal probes, stemming from the fact that it is not possible to maintain direct mechanical control over the attitude or angle of attack of the probe from the surface. Such direct control is precluded because the fluidized zone above the probe solidifies when the heat source is removed. The probe being heavier than the meltwater stands on its tip which is heated for penetration and since the probe is encompassed within a fluidized area, it will tend to lean or fall to one side. Even the slightest deviation from the vertical results in an increasing tendency of the probe to lean or topple over due to an inherent instability which results from the hot point which is also the support point being below the center of gravity. As a result, the probe will follow a hyperbolic path until the probe is in a horizontal attitude.

Certain techniques have been employed heretofore to stabilize thermal probes. One such technique controls the heat flow in the tip of the probe so that if the probe leans to one side, heat flow in the tip is directed to the lower side thereby producing a lateral component to the direction of penetration which tends to rectify the attitude of the probe. In one embodiment of this technique, the heat flow is automatically directed to the lower side of the heated tip by a liquid heat transfer medium located in the tip which moves to the lower side thereof by gravity. Another technique for stabilization which has been used is known as tip angle steering and employs a cone shaped tip with a defined cone angle, a maximum height at which the leaning probe is supported laterally and a long heated length of the probe from the tip upwards. In both of these techniques, the probe stands on its tip and leans against the hole wall and consequently must undergo repeated corrective or rectifying movements which are somewhat inefficient.

The present invention provides a method and apparatus for stabilizing the attitude and accordingly the path of thermal probes, which probes are adapted to melt downwardly through a geological formation, e.g., a solid body composed of rock, ice, or frozen silt etc. without reliance on any mechanical linkage with the surface to control its attitude or direction. Briefly, the stabilization of such probes is accomplished by placing the support point of the probe above its center of gravity. With the support point above the center of gravity, the probe hangs from said support point while penetrating downwardly. Its attitude is plumb at all times. If deflected by some external disturbance, it will return to a vertical attitude in the manner of a pendulum. The support point of the probe is placed above the center of gravity by arranging the load bearing surfaces such that their combined effect, i.e. the center of support, is at the necessary height of the probe.

The invention will be described with reference to the accompanying drawing, of which:

Figure 1:
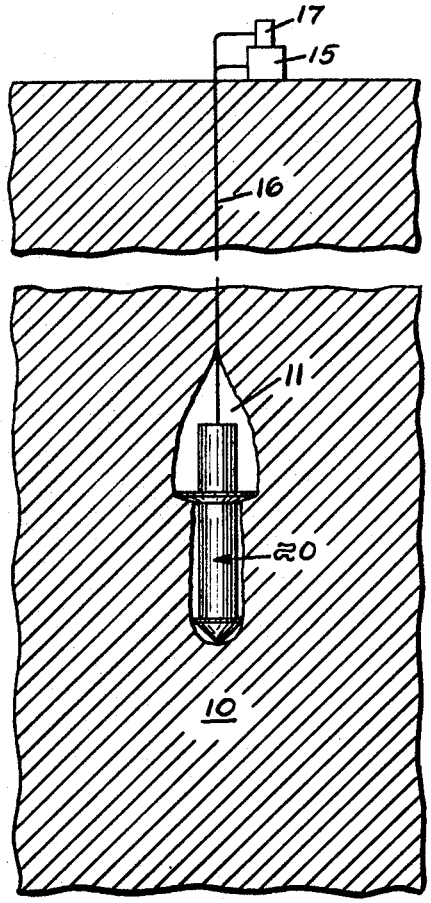
FIGURE 1 is a schematic view of a thermal probe penetrating into an ice mass.

Referring to FIGURE 1, there is shown a thermal probe designated generally as 20, which is of the type suitable for glaciological exploration and is shown after it has penetrated within an ice mass 10. On the surface of the ice there are located electrical power generating equipment 15 and telemetry equipment 17 which are in communication with probe 20 by means of an insulated conductor cable 16. The meltwater 11 formed by the probe 20 as it penetrates the ice mass collects above the probe in the shape of a tapered dome and gradually freezes as the meltwater loses its heat to the surrounding ice.

Figure 2:
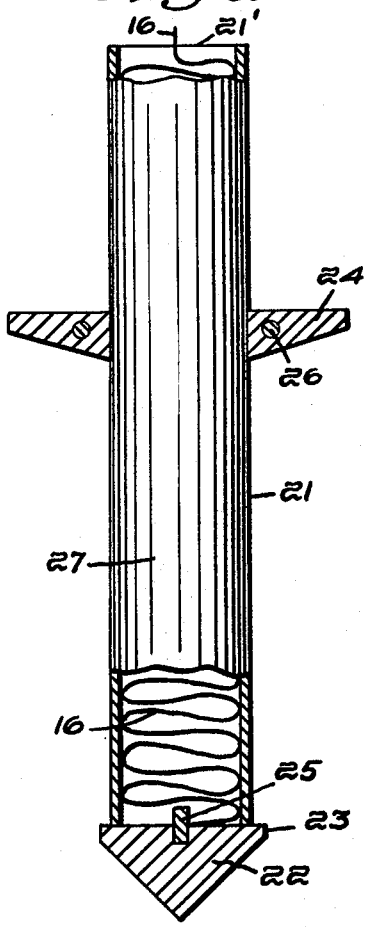
FIGURE 2 is a detailed view in section of the probe shown in FIGURE 1.

Probe 20, shown in greater detail in FIGURE 2, consists of an elongated, hollow, cylinder 21, which in the preferred embodiment has a length approximately 25 times its diameter. Fixed to the lower end of the cylinder is a solid conical tip wich is the lower heat dissipator or hot point 22 and is formed of a thermally conductive metal, e.g. aluminum, copper or an alloy of either metal. In this figure, the side wall 23 of the hot point has a slightly larger diameter than the diameter of the cylinder 21 and while this is not a necessary feature of the invention, it has a useful function under certain situations which will be described later.

An annular solid body which comprises the upper stage heat dissipator or upper hot point 24 extends laterally from the cylinder 21. The upper hot point 24, as shown in FIGURE 2, has an inverted frustoconical shape with a diameter greater than that of the lower hot point 22 and at least 1½ times the diameter of the cylinder 21 and is constructed of a thermally conductive material such as employed for hot point 22. It is essential that the upper hot point 24 be located above the center of gravity of the probe, that is, the center of gravity of the probe should be between the upper hot point and the lower hot point. Fixed within the upper hot point is an electrical resistance heater element 26 which converts electrical energy or power to heat. The heat generated by the heater element is conducted away by the hot point 24 for melting ice with the frontal contact surface. A separate resistance heater 25 is fixed in the lower hot point 22 and provides the thermal energy for this melt surface. In practice, we have utilized resistance heaters having a nominal resistance of 240 ohms.

Within the hollow interior 27 of the cylinder 21, there is a relatively large storage area wherein the coils of conductor cable 16 are located. Also located within the interior of the cylinder, but not shown in the drawings, are the various sensing devices used to detect and measure the physical properties of the ice mass. The conductor cable 16 is payed out through the opening 21' in the top of the cylinder as the probe descends through the ice mass. The conductor cable serves for transmission of electrical power as well as for telemetry of the signals generated by the sensors. The remaining space within the cylinder is filled with a dielectric fluid heavier than and immiscible with water, e.g. a silicone oil, which serves not only to prevent arcing or shorting but also prevents meltwater from entering into the lower portion of the cylinder, containing the internal electrical components, as the cable is withdrawn. Since the zone of meltwater above the probe will lose its heat to the surrounding ice mass and freeze as the probe moves along its downward path, causing the conductor cable to become anchored in the ice, it is essential to have the length of cable necessary for the exploration carried with the probe.

In operation, the thermal probe 20 is held erect in a suitable guide above the ice surface to support the probe until the upper hot point comes into contact with the ice, or alternatively the probe is placed into a borehole which has a diameter greater than the cylinder 21 but less than the diameter of the upper hot point 24. The upper hot point 24 and the lower hot point 22 constitute the bearing surfaces of the probe, which bearing surfaces are heated to cause melting and penetration of the ice. The melt rate, and accordingly the rate of penetration of the probe, is controlled by the heat input. Heat for melting is generated electrically in the heater elements 25 and 26 by electrical energy transmitted from a suitable source on the surface through the conductor cable 16. In the present example, the power required to accomplish melt penetration of the ice is of the order of 4 kilowatts. The heat generated by the heater elements is conducted away by the upper and lower hot points and in turn is transferred to the surrounding ice. If heat is supplied at a greater rate than can be absorbed by the ice, such ice will be melted. The probe being heavier than water sinks into the downwardly advancing zone of meltwater until the upper hot point comes into contact with the ice. At this stage, the downward rate of penetration of the probe will be controlled by the upper hot point for reasons which will be made obvious below.

It has been shown that for equal bearing pressure and equal hot point surface temperature, the rate of penetration of flat surfaces is equal. By keeping the upper hot point at a slightly lower temperature, e.g. of the order of 1 to 5° C. lower than the lower hot point, the rate of penetration of the upper hot point will be less than that of the lower hot point and accordingly the former will support the greater load.

Figure 3:
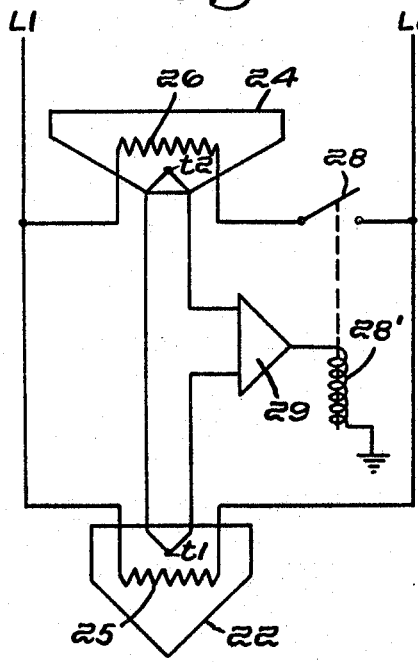
FIGURE 3 is a diagram illustrating the differential temperature control circuit which regulates the electrical power to the upper heater.

In the present example, the upper heater output is automatically controlled relative to the lower heater by a signal which is the function of the temperature difference between the two hot points and which regulates the power to the upper heater. A suitable signal is the voltage created by a thermocouple having one junction located in the lower hot point and the other in the upper hot point. The signal which will be proportional to the temperature difference, controls the power of the upper heater by either a proportional control, achieved with a power transistor, or an on-off control, achieved by actuating a relay or switch. In FIGURE 3, there is shown an electrical control circuit that may be used with either an A.C. or D.C. source of electrical power. $L_1$ and $L_2$ connect to the electrical power supply and are in circuit with heating element 25 contained within lower hot point 22. Power is delivered to the heating element 26 in the upper hot point 24 when the relay switch 28 is closed. Thermocouple junctions $t_1$ and $t_2$, located respectively in the lower and upper hot points, generate a temperature differential signal (voltage) which is amplified by a D.C. amplifier 29 which in turn activates the relay 28'. These and other methods of differential temperature controls are well known in the art.

By intentionally underheating the upper hot point with respect to the lower hot point, the former, as noted, penetrates more slowly and consequently supports most or all of the load of the probe. It should be noted that except for the upper hot point, the probe is wholly encompassed within a zone of meltwater. Since the upper hot point is located above the center of gravity of the probe, this serves to place the center of support for the probe above its center of gravity. The net effect being that the opposing forces of support and gravity keep the probe's attitude in line with the gravity field. If deflected, the probe will swing back like a pendulum to again come in line with the gravity field. Thus, as long as the upper hot point temperature is suitably controlled with respect to the lower hot point temperature, the probe will be stable at any rate of penetration or ice temperature.

The diameter of the hole produced in the ice by the lower hot point is somewhat larger than the hot point itself. This increased diameter results from the higher melt temperature of the lower hot point as compared with the upper hot point and also because the dwell time of the lower hot point is greater than that necessary to accomplish penetration. This increase in hole diameter is desirable since the meltwater begins to lose heat to the ice and the hole tends to decrease in size as the meltwater freezes. As noted earlier, the lower hot point may advantageously have a diameter larger than the diameter of the cylinder since this will also increase the size of the hole relative to the cylinder walls. A certain amount of heat is dissipated laterally from the cylinder walls which also tends to prevent the meltwater from refreezing about the probe. This lateral heat within the cylinder is generated by the stored conductor cable and also by the convection from the upper and lower hot points. The diameter of the hole, however, is less than that of the upper hot point.

While this invention has been described in some detail in connection with a particular type of thermal probe used in glaciological exploration, it is equally applicable to stabilize other thermal devices which penetrate below the surface by melting the underlying geological formation and which must penetrate downwardly in a straight line path along the gravity gradient. For example, a thermal probe suitable for penetrating rock formations and containing its own power source, e.g. a nuclear reactor, can be stabilized in the same manner as has been shown for the ice probe.

Figure 4:
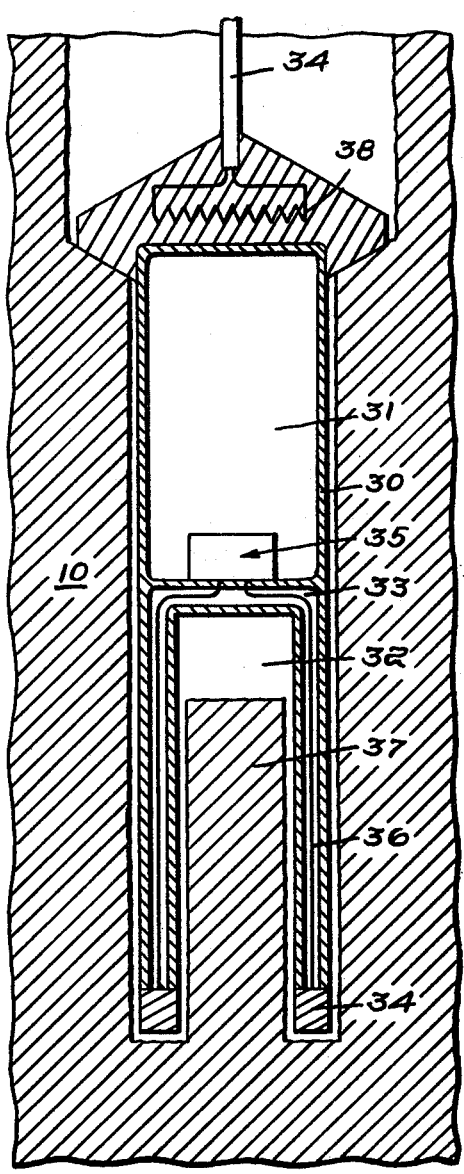
FIGURE 4 is a schematic view in section of a thermal coring drill.

Still another thermal device which may be stabilized is the thermal coring drill illustrated in FIGURE 4. The thermal coring drill penetrates by melting an annular ring in the formation (rock or ice) and breaks off and removes the core within the hole thus formed. In this figure a coring drill, shown forming a deep hole in an ice mass 10, consists of an elongated cylindrical body 30 divided into an upper hollow chamber 31 and a lower hollow chamber 32 by a transverse plate 33. The lower chamber 32 is open at the bottom of the cylindrical body. An electrically heated annular hot point 34 is located about the lowermost edge of the cylindrical body. A meltwater pump 35 pumps the meltwater formed by hot point 34 through water passages 36 in the wall of the cylinder 30 into the upper chamber 31. The ice core 37 formed within the lower chamber is broken off and lifted out of the bore hole by removing the drill. The ice core is broken off and held within the lower chamber 32 by suitable jaws (not shown) which spring out in response to a mechanical or electrical signal from the surface and grip the core within the chamber. Located above the center of gravity of the thermal drill is an upper hot point 38. This hot point has a diameter greater than that of the bore hole and is maintained at a temperature below that of hot point 34. Cable 39 attached to the top of the cylinder 30 supports the weight of the drill and also transmits power to the drill. By locating the upper hot point above the center of gravity of the drill, which hot point is maintained at a temperature lower than that of the annular hot point, the path of the drill is effectively stabilized since the center of support is located above the drill's center of gravity. The drill will hang plumb in the hole formed by the annular hot point. Such drills are especially useful in drilling holes in ice at depths which exceed 100 feet.

The term thermal probe as used herein refers to a device which penetrates by melting and includes externally powered rock and ice probes and thermal coring drills as well as self-powered, e.g. nuclear reactor, fuel cell, etc., rock or ice melting devices.

Although several embodiments and examples of the invention have been described herein, these are intended to be merely illustrative, and various modifications can be made therein without departing from the spirit and scope of the invention as defined in the following claims.

I claim:
1. In a probe for melting and penetrating through a geological formation along a gravitational field from the point of entry toward its center, the combination comprising:
(a) an elongated body,
(b) a lower hot point located at the lower end of said body,
(c) an upper hot point mounted on said body, spaced from said lower hot point so that the center of gravity of said probe lies between said upper hot point and said lower hot point,
(d) means contained within said body for generating sufficient thermal energy to be conducted through said hot points to melt a passage through the geological formation to be penetrated, said means maintaining the temperature of the upper hot point lower than the said temperature of said lower point whereby the stabilizing hot point is caused to support the load of said probe.

2. A probe according to claim 1 wherein said upper hot point has a diameter greater than the diameter of either of said body or said lower hot point.

3. A probe according to claim 2 wherein the density of said probe is greater than the density of the molten mass created by the hot points of the probe.

4. A probe according to claim 3 wherein said body is substantially cylindrical in shape, the axial length of said body being substantially greater than it diameter.

5. A probe according to claim 4 wherein said lower hot point is an annular ring and said body is open at the lower end thereof.

6. A probe according to claim 4 wherein said lower hot point is a solid structure having a diameter at least as great as the diameter of said body.

7. A probe according to claim 4 wherein said upper hot point is an annular shaped body extending laterally from said elongated body.

8. A probe according to claim 4 wherein said geological formation is a mass of ice and wherein said means within said body for generating thermal energy are electrical resistance heaters which are powered by electrical energy.

9. A probe according to claim 8 wherein said body contains a coil of electrically conductive insulated cable adapted to be payed out of said body as the probe penetrates into the ice, said cable conducting electrical energy from the surface to the probe.

10. In a probe according to claim 9 wherein said lower and said upper hot points contain separate electrical resistance heater units, and having a temperature differential sensing means that controls the power applied to said heater units whereby the temperature of the upper hot point is maintained below that of the lower hot point.

References Cited

UNITED STATES PATENTS

| | | | |
|---|---|---|---|
| 2,623,149 | 12/1952 | Amar | 175—16 |
| 2,684,669 | 7/1954 | Ostrowski | 175—11 |
| 3,115,194 | 12/1963 | Adams | 175—11 |

FOREIGN PATENTS 240,634    5/1946    Switzerland.

DAVID H. BROWN, *Primary Examiner.*